United States Patent [19]
Colvin et al.

[11] Patent Number: 4,768,600
[45] Date of Patent: Sep. 6, 1988

[54] HIGH SPEED WEIGHING SYSTEM

[76] Inventors: David P. Colvin, Rte. 5, Box 67, Apex, N.C. 27502; Ralph W. Barnes, 440 Flynt Valley Dr., Winston-Salem, N.C. 27104

[21] Appl. No.: 886,983
[22] Filed: Jul. 16, 1986
[51] Int. Cl.$^4$ ............................ G01G 19/52; B07C 5/28
[52] U.S. Cl. ............................................. 177/1; 177/50; 177/145; 209/593
[58] Field of Search ............... 177/1, 50, 210 FP, 145; 209/593-595

[56] References Cited

U.S. PATENT DOCUMENTS

| | | |
|---|---|---|
| 2,866,059 | 12/1958 | Laimins . |
| 2,927,785 | 3/1960 | Lyons . |
| 3,168,153 | 2/1965 | Dinter et al. . |
| 3,192,535 | 6/1965 | Watson . |
| 3,439,761 | 4/1969 | Laimins . |
| 3,446,299 | 5/1969 | Leonowicz . |
| 3,545,611 | 12/1970 | Husome ............................ 177/1 X |
| 3,576,128 | 4/1971 | Lockery . |
| 3,857,488 | 12/1974 | Le Cren ............................ 209/593 |
| 3,949,822 | 4/1976 | English et al. . |
| 4,212,197 | 7/1980 | Kawai et al. . |
| 4,260,034 | 4/1981 | Randolf, Jr. . |
| 4,285,411 | 8/1981 | Hino et al. . |
| 4,623,813 | 11/1986 | Naito et al. ............... 177/210 FP X |

FOREIGN PATENT DOCUMENTS

| | | |
|---|---|---|
| WO83/00222 | 1/1983 | PCT Int'l Appl. . |
| 2033725A | 5/1980 | United Kingdom . |
| 315949 | 2/1972 | U.S.S.R. . |
| 879315 | 11/1981 | U.S.S.R. . |

Primary Examiner—George H. Miller, Jr.
Attorney, Agent, or Firm—Richard E. Jenkins

[57] ABSTRACT

A high speed weighing system for weighing articles moving along a conveyor or the like wherein the article to be weighed is dropped onto a weighing platform and weighed during a predetermined time period as it traverses the weighing platform. The weighing platform is secured to a structural transducer having electrical strain gauges in connection with fast-summing amplification and integration circuitry.

19 Claims, 3 Drawing Sheets

4,768,600

HIGH SPEED WEIGHING SYSTEM

TECHNICAL FIELD

The present invention relates to improvements in the high speed precision measurement of the weight of articles moving along a conveyor line or the like. In particular, the present invention provides for a system to be interposed along a conveyor line which utilizes the combination of a weighing platform with a structural transducer and electrically connected fast-summing amplification and integration circuitry in order to achieve a speed and accuracy in weighing articles moving along a conveyor or the like which has not heretofore been possible.

BACKGROUND ART

It is known to measure the weight of an article through the use of a transducer structure of the type incorporating electrical strain gauges connected in a Wheatstone bridge configuration. Typically, the transducer structure is electrically connected to conventional amplifier circuitry and the amplified signal then measured in order to determine the weight of the article in contact with a weighing platform or other support to which the transducer structure is secured in order to detect strain induced by the weight of the article.

For example, U.S. Pat. No. 3,439,761 to Laimins discloses a strain gage transducer structure which is positioned immediately beneath a moving conveyor belt in order to measure the shear forces exerted by a load being transported by a conveyor belt traveling across a platform scale. U.S. Pat. No. 3,168,153 to Dinter et al. discloses a weighing system for railroad vehicles which utilizes a plurality of strain gauges in electrical connection and secured to the rail at predetermined locations in order to detect elastic deformation of the rail and thereby determine the weight of the vehicle. This system also utilizes a Wheatstone bridge configuration for the strain gauges in electrical connection with a voltage source and amplifier. Also of interest is the conveyor weighing scale of Lyons disclosed in U.S. Pat. No. 2,927,785, the high speed weighing method and apparatus of Watson disclosed in U.S. Pat. No. 3,192,535 and the dynamic weighing systems taught by Leonowicz in U.S. Pat. No. 3,446,299 and Le Cren in U.S. Pat. No. 3,857,488. Although applicant acknowledges the wide-spread application of structural transducers to measure the weight of an article passing over an associated platform or scale, applicant is not aware of any prior art which teaches dropping the article to be weighed onto the weighing platform so that it skips across the platform and provides for a weighing rate of up to eight articles per second at a very high level of accuracy.

DISCLOSURE OF THE INVENTION

In accordance with the present invention, applicant provides a high speed weighing system which can be interposed at a selected location along a conveyor so as to weigh articles which are dropped onto and skip across the impact plate of the high speed weighing system. In order for the weighing system to properly function, it should be appreciated that the upstream side of the conveyor should terminate adjacent to and vertically above the impact plate of the high speed weighing system and the downstream side of the conveyor should be positioned adjacent to and substantially in the same horizontal plane as the weighing system. In this fashion, the high speed weighing system measures both the potential and kinetic energy of an article skipping and sliding across the impact plate of the weighing system as the article to be weighed drops from the upstream conveyor and traverses the impact plate onto the downstream conveyor.

In order to accomplish high speed weighing of as many as about 400-500 articles per minute, the weighing system utilizes a horizontal impact plate measuring about 5×10 inches which is fixedly secured to one end of a cantilevered mini-beam of a structural transducer with the other end of the mini-beam being fixedly secured to a suitable support. The mini-beam has an aperture therein and utilizes a pair of strain gauges secured to both the top and bottom of the beam adjacent the aperture. This configuration provides maximum damping together with high sensitivity due to concentration of the stress and strain about the aperture. The four strain gauges are electrically connected in a balanced four-way Wheatstone bridge circuit with the electrical output signal being fed into a fast-summing amplifier. The output signal from the strain gauges is amplified by a fast-summing amplifier circuit and the signal therefrom fed to an integrator circuit in order to measure the weight of the article which has skipped across the impact plate of the high speed weighing system. The integrator circuit is actuated only during a predetermined time period while the article to be weighed is on the impact plate, and this integration time is controlled by a timing circuit. After the integration circuit has integrated the signal from the fast-summing amplifier, it is compared to a target value or range of values by a comparator circuit. The timing circuit then sends a pulse to the comparator circuit which generates a signal to indicate whether the article weighed is within acceptable bounds. This signal can be used to control other equipment or to merely accept or reject the article weighed. After the comparator circuit signal has been generated, the timing circuit resets the integrator circuit and prepares for the presence of the next article to be weighed.

It is believed that the high speed weighing system should most suitably utilize a vertical drop of about 0.5 inch to 12 inches and the horizontal sliding distance should most suitably be about 0.5 to 2 feet in order to best achieve the speed and accuracy contemplated by the instant invention.

Accordingly, it is one of objects of the present invention to provide a novel and improved high speed weighing system utilizing a structural transducer and improved electrical circuitry for efficient and high speed weighing of articles being transported along a conveyor belt or the like.

Another object of the invention is to provide a high speed weighing system which responds to both kinetic and potential energy forces created when the article to be weighed is dropped upon and skips or slides across the weighing platform of the system.

Still further, it is an object of the instant invention to measure the weight of articles being transported by a conveyor belt or the like at a speed and accuracy which has not heretofore been possible.

BRIEF DESCRIPTION OF DRAWINGS

Some of the objects of the invention having been stated, other objects will become evident as the descrip

BEST MODE FOR CARRYING OUT THE INVENTION

Figure 1:
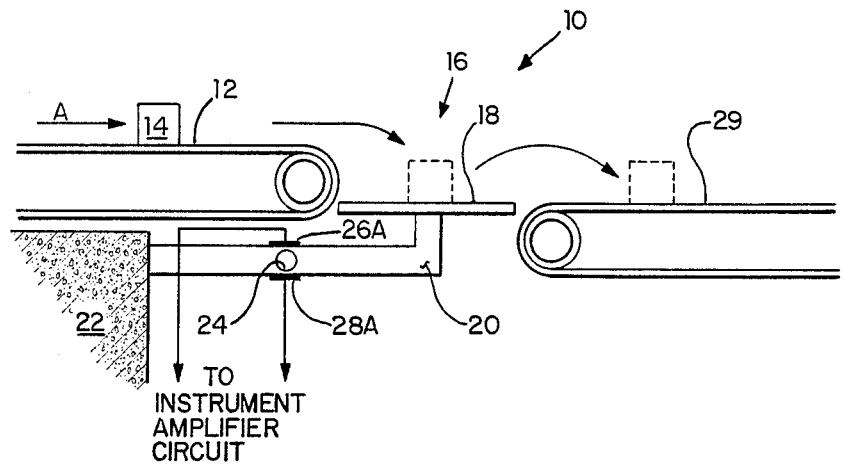
- FIG. 1 is a diagrammatic side view of the high speed weighing system of the present invention.

Referring now to the drawings, FIG. 1 depicts a diagrammatic side view of the high speed weighing system of the present invention which is generally designated 10. High speed weighing system 10 is shown as comprising a conveyor 12 carrying an article 14 thereon. Conveyor 12 terminates at a position adjacent to and above weighing platform 16. Weighing platform 16 includes an impact plate 18 which is secured to one end of cantilever beam 20. Cantilever beam 20 is secured at its other end to a fixed support 22. Cantilever beam 20 has an aperture 24 therethrough and a first pair of strain gauges 26A, 26B secured to cantilever beam 20 above aperture 24 and a second pair of strain gauges 28A, 28B secured to the bottom of cantilever beam 20 adjacent aperture 24. A second conveyor 29 is positioned on the opposite side of impact plate 18 from conveyor 12 and in substantially the same horizontal plane as impact plate 18. In electrical connection with strain gauge pairs 26A, 26B (not shown) and 28A, 28B (not shown) is the circuitry illustrated in FIGS. 2 and 3 of the drawings.

Article 14 is horizontally transported by conveyor 12 in the direction of Arrow A and then dropped onto impact plate 18 at such a velocity as to skip and slide thereacross onto second conveyor 29. During the short time while article 14 is in contact with impact plate 18 of weighing platform 16, the associated electrical circuitry measures the potential and kinetic energy of article 14 and derives the absolute weight of article 14 which is then compared to a target value or a range of values in order to generate a signal indicating acceptance or rejection of article 14. It should be appreciated that the high speed weighing system of the invention is capable of weighing approximately eight articles per second with an error rate of approximately 0.00002.

Figure 2:
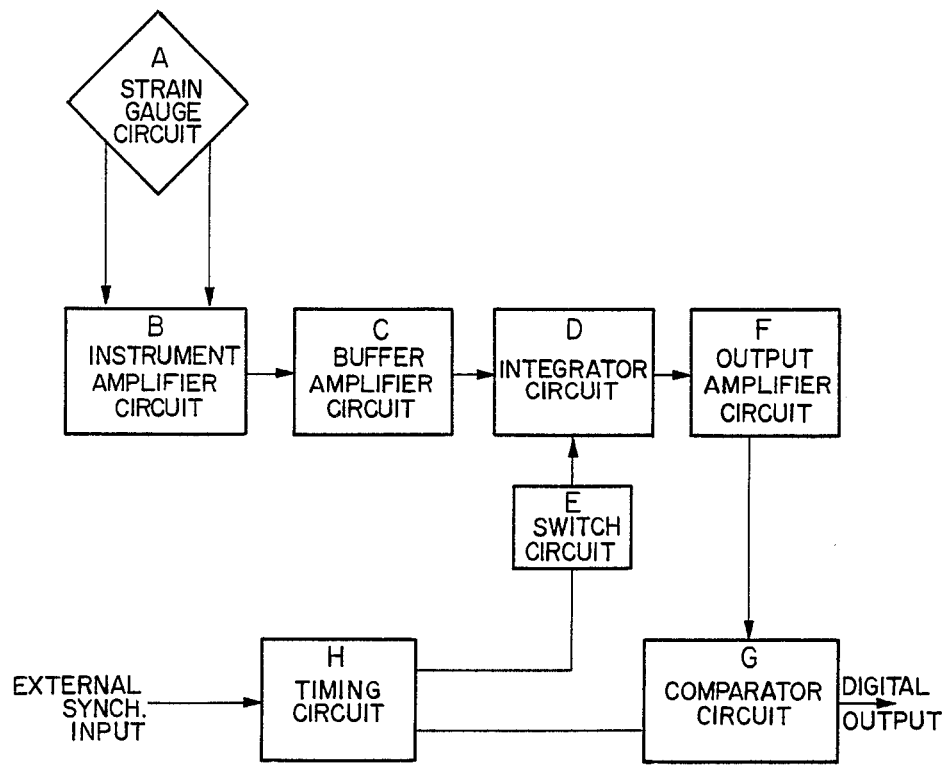
FIG. 2 is a block diagram of the electrical circuitry of the high speed weighing system of the present invention.
Figure 3A:
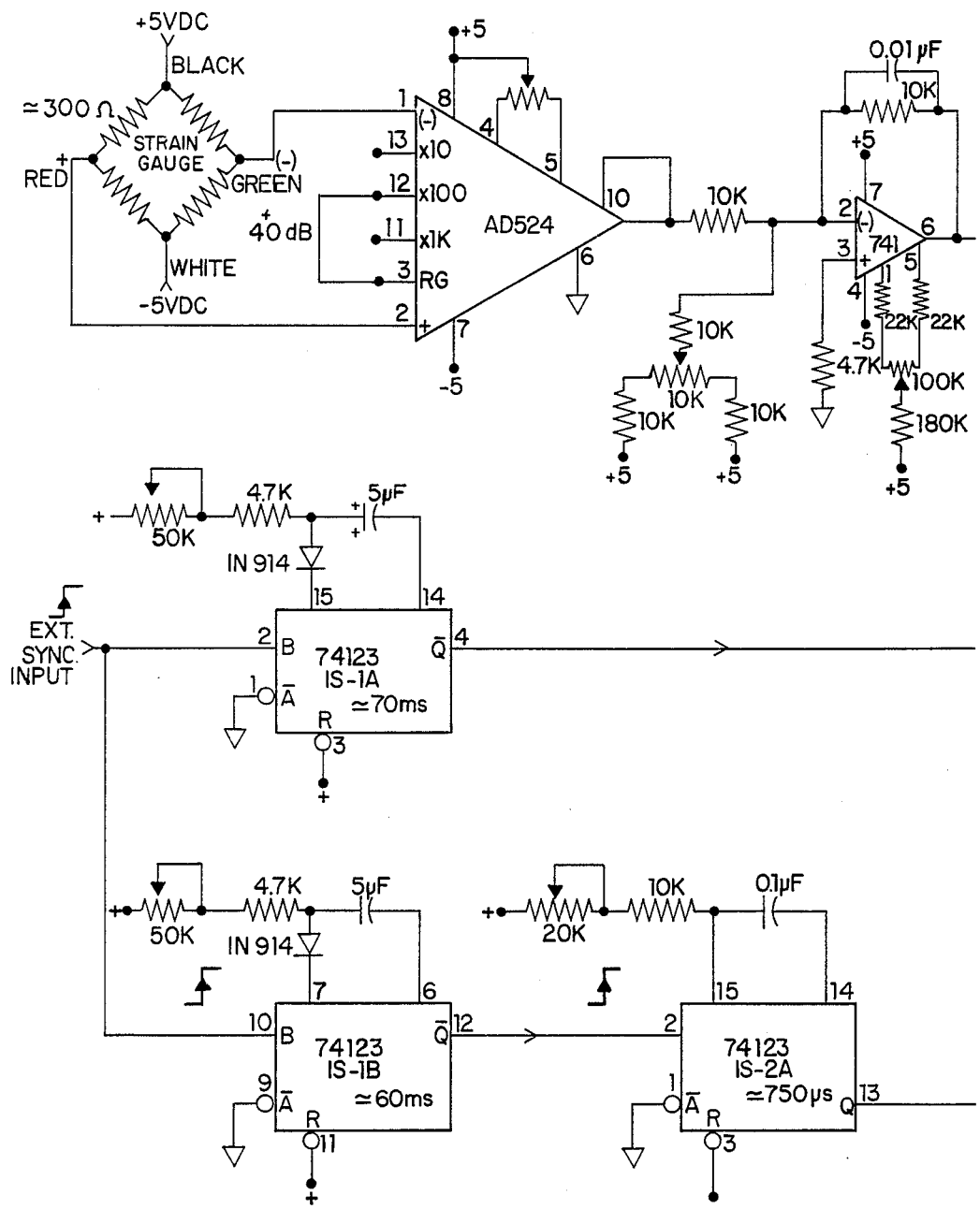
FIGS. 3A-3B is a detailed electrical circuit diagram of the electrical circuit of FIG. 2.
Figure 3B:
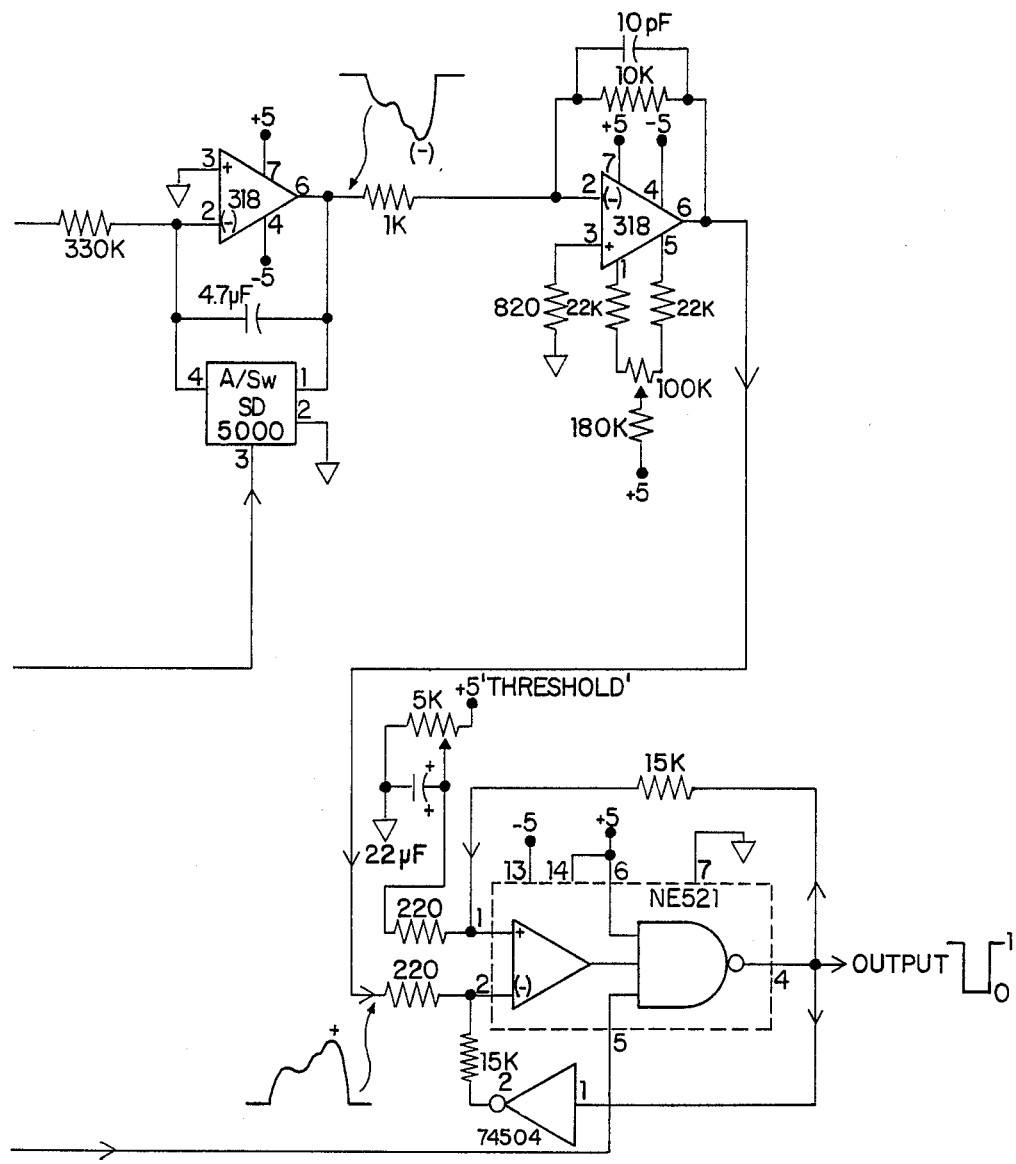

For a better understanding of the electrical circuitry of the inventive system, reference should now be had to FIGS. 2 and 3A-3B. Although the specific circuitry of FIGS. 3A-3B has been found to be suitable in the preferred embodiment of the invention, it is contemplated that other circuitry can be utilized while still staying within the scope of the instant invention. The specific electrical circuits utilized and depicted in FIGS. 3A and 3B are readily available analog and digital integrated circuits. Also, although weighing platform 16 has been described as positioned between a first and second conveyor, the high speed weighing system of the invention contemplates that weighing platform 16 could also be positioned at the terminal end and vertically beneath a conveyor, slide or the like to weigh articles being dropped onto the platform of the weighing system.

METHOD OF OPERATION

In operation, assume the system is in the quiescent state. During this state, amplifier circuit B output is at or near zero volts output, integrator circuit D is reset and held at zero volts, timing circuit H is waiting for the arrival of the next article to be weighed, and output comparator circuit G is not in its active state.

When a start pulse to timing circuit H arrives from a sensor (such as an electric eye) indicating the arrival of the next article to be weighed, the leading edge of a pulse triggers a monostable multivibrator in timing circuit H which in turn switches integrator circuit D to the integrate mode through switch circuit E. The monostable multivibrator is in the active state long enough for the article to be weighed to impact upon strain gauge circuit A and for the resulting waveform to be integrated. The integrator output is amplified and inverted in output amplifier circuit F. The output amplifier waveform is fed to one input of analog comparator circuit G. The second input to analog comparator circuit G is a threshold voltage level (see FIG. 3B).

The leading edge of the start pulse from the sensor also simultaneously triggers a second monostable multivibrator in timing circuit H. This second monostable multivibrator serves as a time delay. At the end of the time delay a short time pulse is initiated which activates the output of analog comparator circuit G.

The output from analog comparator circuit G can be activated according to the level of the signal from output amplifier circuit F and the threshold. In the first instance, analog comparator circuit G can be constructed so that if the signal from output amplifier circuit F is less than the threshold at the time of the activator pulse from analog comparator circuit G, the article weighed is determined to be less than a desired weight as set by the threshold voltage. The output from analog comparator circuit G is then active and could be used to activate other equipment to reject the article.

In the second instance, analog comparator circuit G can be constructed so that if the signal from output amplifier circuit F is greater than the threshold at the time of the analog comparator activator pulse, the article weighed is greater than the desired weight as set by the threshold voltage. The output from analog comparator circuit G is then active and could be used to activate other equipment to reject the article.

By using two comparator circuits in parallel, each constructed as described above and as shown in FIG. 3B, the weighing system of the invention can be used to insure that the article weight is greater than some minimum weight determined by one threshold, and less than some maximum weight determined by the second threshold.

At the conclusion of the activation time of the pulse from analog comparator circuit G, the analog comparator circuit returns to the inactive state. Shortly afterwards, the first monostable multivibrator completes its timing cycle. At this time integrator circuit D is reset to the quiescent state. Timing circuit H is inactive and awaits the arrival of the next start pulse from the sensor.

It will be understood that various details of the invention may be changed without departing from the scope of the invention. Furthermore, the foregoing description is for the purpose of illustration only, and not for the purpose of limitation—the invention being defined by the claims.

What is claimed is:

1. A method for rapid weighing of articles including the steps of:

transporting an article to a non-resilient and stationary weighing platform supported by structural transducer means and positioned vertically below the delivery end of the transporting means;

dropping said article onto said weighing platform at a velocity sufficient for the article to impact and skip across said weighing platform;

amplifying an electrical signal generated by said structural transducer means as said article skips across said weighing platform;

integrating the amplified electrical signal for a predetermined time period;

comparing the integrated signal value to at least one target weight value; and generating an output signal indicating acceptance or rejection of said article being weighed.

2. A method for rapid weighing of articles according to claim 1 wherein said article skips onto another transporting means after traversing said weighing platform.

3. A method for rapid weighing of articles according to claim 1 wherein said electrical signal from said transducer means is amplified by a fast summing amplifier which automatically resets after each measurement.

4. A method for rapid weighing of articles according to claim 1 wherein said structural transducer means comprises a structural beam which supports said weighing platform at one end thereof and is rigidly connected to a fixed support at the other end thereof, said structural transducer means also defining an aperture therein and including a plurality of strain gauges secured thereto adjacent said aperture.

5. A method for rapid weighing of articles according to claim 4 wherein said plurality of strain gauges comprises a first pair of strain gauges positioned above and a second pair of strain gauges positioned beneath the aperture of said structural beam, said strain gauges being electrically connected in a Wheatstone bridge circuit.

6. A method for rapid weighing of articles according to claim 1 wherein about 400-500 articles per minute are weighed with an error rate of about 0.00002.

7. An apparatus for rapid weighing of articles comprising:

means for transporting an article to be weighed to a predetermined location;

a non-resilient and stationary platform positioned vertically beneath the terminal end of said means for transporting the article so the article will be dropped thereon and skip thereacross;

structural transducer means supportingly engaging said platform;

a fast-summing amplifier circuit for summing the signal from said structural transducer means as the article skips across said platform;

an integrator circuit for integrating the signal generated by said amplifier circuit over a predetermined time period;

a comparator circuit for comprising the signal generated by said integrator circuit to at least one target value and generating an output signal relating thereto; and a timing circuit for controlling the time during which the signal from said amplifier circuit is integrated and for determining when the output signal from said comparator circuit is to be generated.

8. An apparatus for rapid weighing of articles according to claim 7 including sensor means for detecting the initial presence of the article on said platform and for sending a signal to the timing circuit.

9. An apparatus for rapid weighing of articles according to claim 7 wherein said means for transporting is a first endless belt-type conveyor.

10. An apparatus for rapid weighing of articles according to claim 9 including a second endless belt-type conveyor positioned adjacent the opposite side of said platform from said first belt for continuing the transportation of the article after it skips across said platform.

11. An apparatus for rapid weighing of articles according to claim 7 wherein said platform comprises a flat surface which is positioned about 0.25 to 12 inches beneath said transporting means.

12. An apparatus for rapid weighing of articles according to claim 7 wherein said structural transducer means comprises a structural beam which supports said platform at one end thereof and is rigidly connected to a fixed support at the other end thereof, said structural transducer means further defining an aperture therein and including a plurality of strain gauges secured thereto adjacent said aperture.

13. An apparatus for rapid weighing of articles according to claim 12 wherein said plurality of strain gauges comprises a first pair of strain gauges positioned above and a second pair of strain gauges positioned beneath said aperture, said strain gauges being electrically connected in a Wheatstone bridge circuit.

14. An apparatus for rapid weighing of articles according to claim 7 wherein said timing circuit comprises a first monostable multivibrator for activating said integrator circuit and a second monostable multivibrator for activating the output signal from said comparator circuit.

15. An apparatus for rapid weighing of articles according to claim 7 including a second comparator circuit in parallel connection to said first comparator circuit for comparing the signal generated by said integrator circuit to minimum and maximum target values and generating an output signal relating thereto.

16. A method for rapid weighing of articles including the steps of:

transporting an article to a weighing platform supported by structural transducer means and positioned vertically below the delivery end of the transporting means, wherein said structural transducer means comprises a structural beam which supports said weighing platform at one end thereof and is rigidly connected to a fixed support at the other end thereof, said structural transducer means also defining an aperture therein and including a plurality of strain gauges secured thereto adjacent said aperture;

dropping said article onto said weighing platform at a velocity sufficient for the article to impact and skip across said weighing platform;

amplifying an electrical signal generated by said structural transducer means as said article skips across said weighing platform;

integrating the amplified electrical signal for a predetermined time period;

comparing the integrated signal value to at least one target weight value; and generating an output signal indicating acceptance or rejection of said article being weighed.

17. A method for rapid weighing of articles including the steps of:

transporting an article to a weighing platform supported by structural transducer means and positioned vertically below the delivery end of the transporting means, wherein said structural transducer means comprises a structural beam which supports said weighing platform at one end thereof and is rigidly connected to a fixed support at the other end thereof, said structural transducer means also defining an aperture therein and including a plurality of strain gauges secured thereto adjacent said aperture, said plurality of strain gauges comprising a first pair of strain gauges positioned above and a second pair of strain gauges positioned beneath the aperture of said structural beam, said strain gauges being electrically connected in a Wheatstone Bridge circuit;

dropping said article onto said weighing platform at a velocity sufficient for the article to impact and skip across said weighing platform;

amplifying an electrical signal generated by said structural transducer means as said article skips across said weighing platform;

integrating the amplified electrical signal for a predetermined time period;

comparing the integrated signal value to at least one target weight value; and generating an output signal indicating acceptance or rejection of said article being weighed.

18. An apparatus for rapid weighing of articles comprising:

means for transporting an article to be weighed to a predetermined location;

a platform positioned vertically beneath the terminal end of said means for transporting the article so the article will be dropped thereon and skip thereacross;

structural transducer means supportingly engaging said platform, wherein said structural transducer means comprises a structural beam which supports said platform at one end thereof and is rigidly connected to a fixed support at the other end thereof, said structural transducer means further defining an aperture therein and including a plurality of strain gauges secured thereto adjacent said aperture;

a fast-summing amplifier circuit for summing the signal from said structural transducer means as the article skips across said platform;

an integrator circuit for integrating the signal generated by said amplifier circuit over a predetermined time period;

a comparator circuit for comparing the signal generated by said integrator circuit to at least one target value and generating an output signal relating thereto; and a timing circuit for controlling the time during which the signal from said amplifier circuit is integrated and for determining when the output signal from said comparator circuit is to be generated.

19. An apparatus for rapid weighing of articles comprising:

means for transporting an article to be weighed to a predetermined location;

a platform positioned vertically beneath the terminal end of said means for transporting the article so the article will be dropped thereon and skip thereacross;

structural transducer means supportingly engaging said platform, wherein said structural transducer means comprises a structural beam which supports said platform at one end thereof and is rigidly connected to a fixed support at the other end thereof, said structural transducer means further defining an aperture therein and including a plurality of strain gauges secured thereto adjacent said aperture, said plurality of strain gauges comprising a first pair of strain gauges positioned above and a second pair of strain gauges positioned beneath said aperture, said strain gauges being electrically connected in a Wheatstone Bridge circuit;

a fast-summing amplifier circuit for summing the signal from said structural transducer means as the article skips across said platform;

an integrator circuit for integrating the signal generated by said amplifier circuit over a predetermined time period;

a comparator circuit for comparing the signal generated by said integrator circuit to at least one target value and generating an output signal relating thereto; and a timing circuit for controlling the time during which the signal from said amplifier circuit is integrated and for determining when the output signal from said comparator circuit is to be generated.

* * * * *